Nov. 27, 1934.  E. G. McDONALD  1,981,963
BRAKE
Filed Nov. 7, 1930    2 Sheets-Sheet 1

INVENTOR
EUGENE G. McDONALD
BY M. W. McConkey
ATTORNEY

Nov. 27, 1934.  E. G. McDONALD  1,981,963
BRAKE
Filed Nov. 7, 1930    2 Sheets-Sheet 2

INVENTOR
EUGENE G. McDONALD
BY
*M. W. McConkey*
ATTORNEY

Patented Nov. 27, 1934

1,981,963

UNITED STATES PATENT OFFICE 1,981,963

BRAKE

Eugene G. McDonald, South Bend, Ind., assignor to Bendix Brake Company, South Bend, Ind., a corporation of Illinois Application November 7, 1930, Serial No. 493,929

1 Claim. (Cl. 188—78)

This invention relates to brakes and is illustrated as embodied in an internal expanding brake for an automobile. An object of the invention is to provide simple operating means for a brake of the self-energizing type, particularly means suitable for operation in a brake of this type when mounted on a front wheel.

One feature of the invention relates to the arrangement of the brake with a novel operating lever linked or otherwise connected to the unanchored end of the brake friction means, the lever preferably being fulcrumed on a pivot carried by a reinforcement which also serves to support a second pivot serving as the brake anchor and on which the other end of the brake friction means is mounted. Another feature of the invention relates to the operation of a brake operating lever, which may be the lever described above, by pivoting the lever immediately below a hollow king pin on which the wheel is swiveled and operating it by means such as a lengthwise movable thrust rod extending through the hollow king pin.

The above and other objects and features of the invention, including various novel and desirable constructions, will be apparent from the following description of the illustrative embodiments shown in the accompanying drawings, in which.

Figure 1:
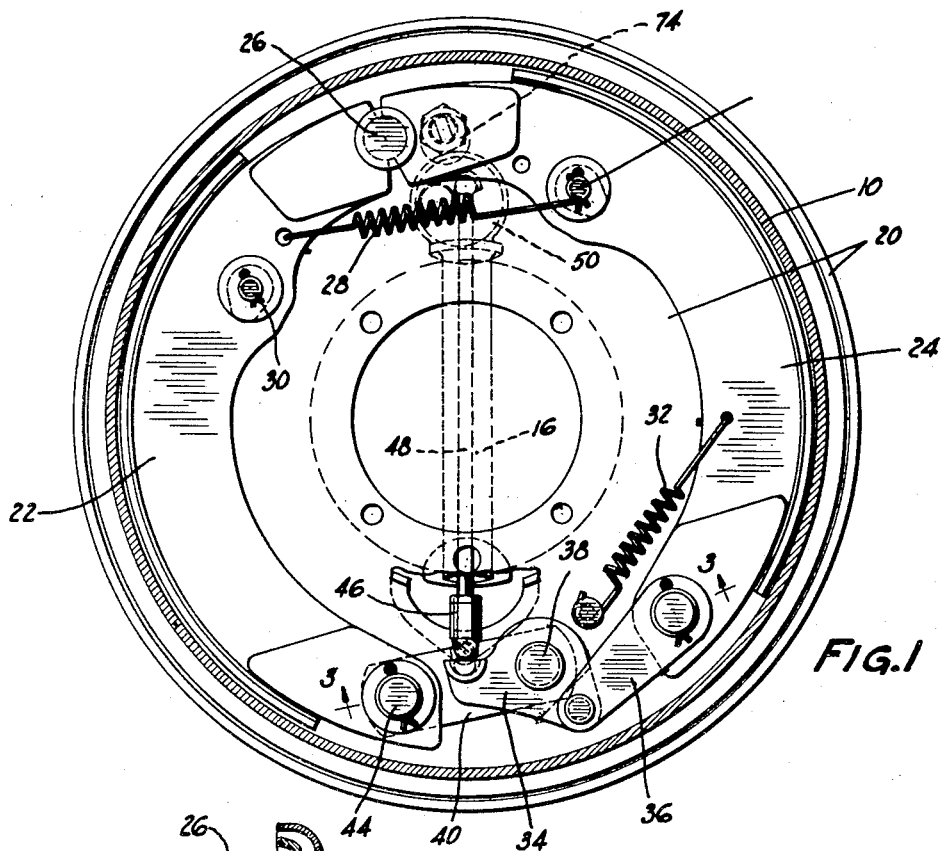
Figure 1 is a vertical section through a brake embodying my invention, just inside the head of the brake drum and showing the brake shoes in side elevation.
Figure 2:
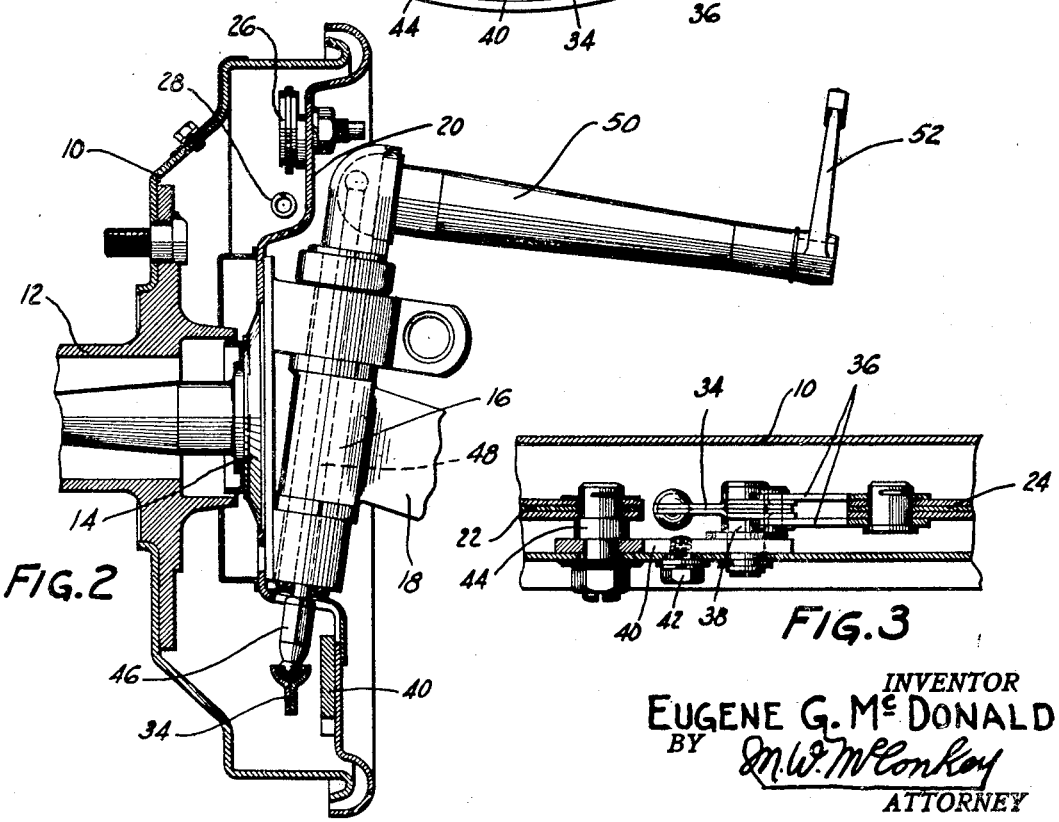
Figure 2 is a vertical section through the brake of Figure 1 and at right angles to Figure 1 and showing the mounting of the wheel and the brake on the front wheel knuckle.

The brake illustrated in Figures 1 and 2 includes a rotatable drum 10 mounted with the wheel, the hub of which is shown at 12, on a front wheel knuckle 14 connected by means such as a hollow king pin 16 to one end of a front axle 18. At the open side of the brake drum is arranged a suitable support such as a backing plate 20 carried by the knuckle 14 and on which is mounted the friction means of the brake. The brake friction means is preferably of the self-energizing type and may include a pair of shoes 22 and 24 connected by a floating pivot 26 against which the shoes are held by a spring 28 tensioned between the upper ends of the shoes. The shoes may be provided with steady rests 30 of any desired form.

Figure 3:
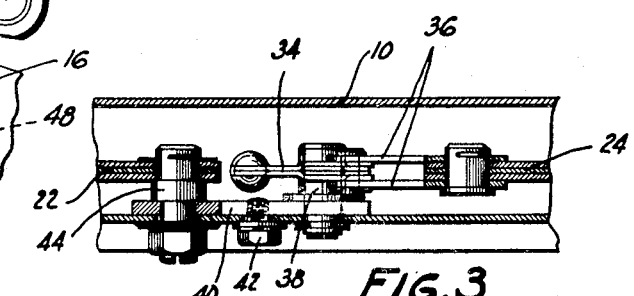
Figure 3 is a partial section on the line 3—3 of Figure 1 showing the novel applying means.

The brake is applied, against the resistance of a return spring 32 tensioned between the backing plate and the shoe 24, by novel means which in the embodiment illustrated in Figure 1 includes a bell crank lever 34 formed by spot welding two stampings together and connected to the unanchored end of the shoe 24 by means such as a pair of thrust links 36 pivotally connected to the lever 34 at their lower ends and to the end of shoe 24 at their upper ends. The bell crank lever is fulcrumed on a pivot 38 carried by a reinforcing plate 40 engaging the backing plate and secured thereto by the pivot 38 and by a set screw 42 and by an anchor pivot 44 upon which the lower end of the shoe 22 is pivoted. It will be noted in Figure 3 that the openings in the backing plate for the anchor pivot 44 and for the set screw 42 have a slight clearance so that the anchor may be adjusted angularly about pivot 38.

The other arm of the lever 34 has the stampings flared apart to form a socket for a ball formed on the end of a thrust member 46 adjustably threaded on the lower end of a thrust link 48 passing through the hollow king pin 16. The upper end of the link 48 is rounded to seat in an eccentrically arranged socket formed on the end of a shaft 50 operated by a suitable means connected to a lever 52. The shaft 50 is suitably supported on the axle 18. The shaft 50 therefore does not swivel with the wheel and when the wheel is turned to the right or left in steering, the brake connection 48 swivels in its socket in the end of the shaft 50 so that the steering movement of the wheel is not interfered with whether or not the brake is applied. This method of operating the thrust rod 48 is well known, being now in commercial use.

Figure 5:
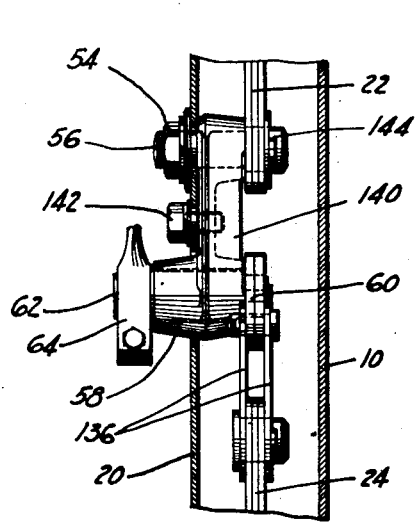
Figure 5 is a section on the line 5—5 of Figure 4 showing the applying and anchoring means.
Figure 4:
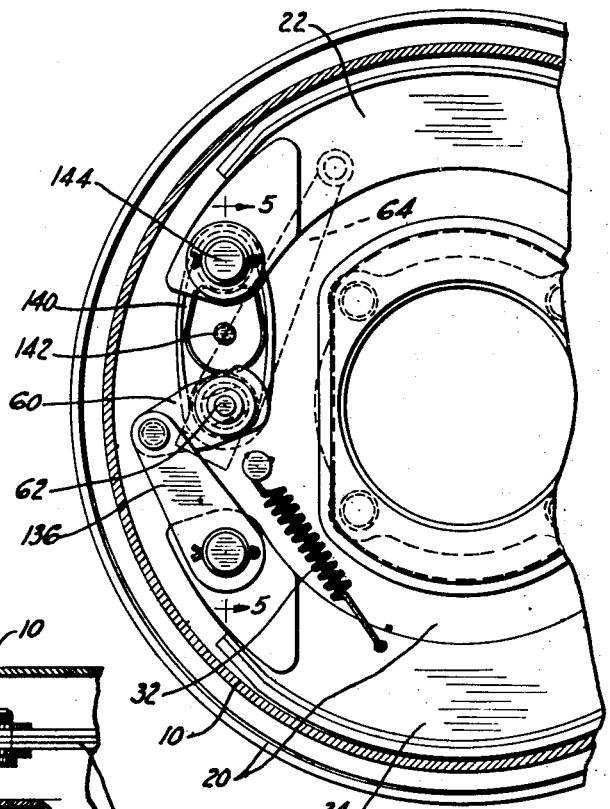
Figure 4 is a section corresponding to Figure 1 but showing the brake arranged for use on a rear wheel.

In the arrangement of Figures 4 and 5, in place of the stamped reinforcing plate 40 there is provided a forged reinforcing plate 140 having an anchor stud 144 upon which the shoe 22 is mounted. The forged reinforcement is secured to the backing plate by a set screw 142 and by a nut 54 threaded on a stud 56 projecting through the backing plate. The opposite end of the reinforcement is formed with a boss 58 to support a bell crank lever comprising an arm 60 connected by links 136 to the end of shoe 24, together with a shaft portion 62 journalled in boss 58 and an applying lever 64 outside of the backing plate and connected to the brake hookup. This arrangement is suitable for a brake mounted on a rear wheel.

Figure 7:
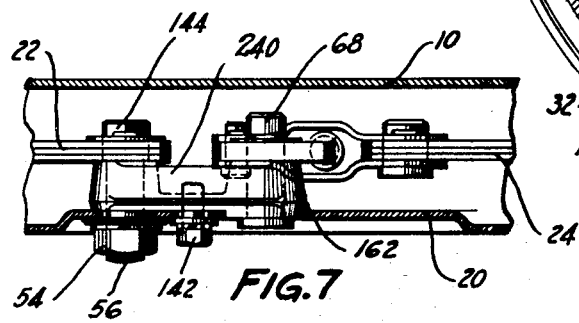
Figure 7 is a partial section on the line 7—7 of Figure 1 and showing the novel applying and anchoring means.
Figure 6:
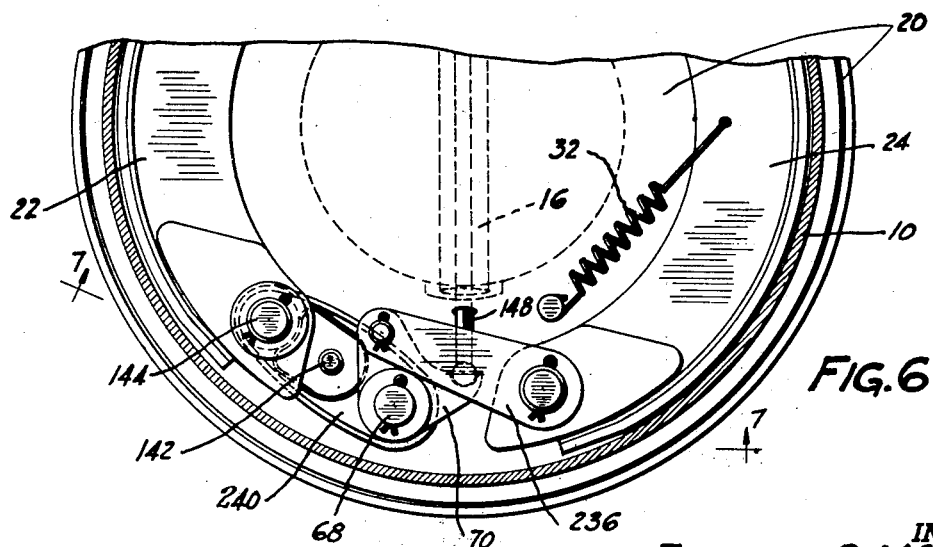
Figure 6 is a section corresponding to the lower part of Figure 1 and showing a different mounting of the operating lever.

The arrangement of Figures 6 and 7 utilizes a forged reinforcement 240 similar to the reinforcements 40 and 140 described above except that the boss 162 is not extended outside the backing plate and also in that this boss is provided with a pivot 68 upon which is mounted a bell crank lever 70 having one arm connected by means such as links 236 to the unanchored end of the shoe 24 and having its other arm formed with a socket for the lower end of a thrust rod 148 corresponding to the rod 48 in Figure 1.

In all these forms it will be seen that manipulation of the rod 48 or 148 or of the lever 64 will operate through the links 36 or 136 or 236 to force the shoe 24 against the drum to apply the brake. The shoe 24 turns with the drum when the vehicle is moving forward (or against the drum when the vehicle is moving backward) to force the shoe 22 against the drum, the torque of both of the shoes being taken on the anchorage 44 or 144. When the brake is released, the idle position of the upper ends of the shoes is determined by means such as an eccentric stop 74 arranged to be engaged by the edge of the pivot 26 between the two brake shoes.

While several illustrative embodiments of the invention have been described in detail, it is not my intention to limit the scope of the invention to this particular embodiment or otherwise than by the terms of the appended claim.

I claim:

A vehicle having a wheel with a swiveled mounting including a hollow king pin, in combination with a backing plate carried by said mounting and provided with brake friction means having its ends below said king pin, a reinforcement for the backing plate below the king pin which is provided with two pivots, on one of which one end of the friction means is anchored, a lever fulcrumed on the other pivot and acting on the unanchored end of the friction means and having at one end a socket in line with the hollow king-pin, and thrust means extending through the hollow king pin and having a rounded portion seated in said socket.

EUGENE G. McDONALD.